US012789715B1

(12) United States Patent
Scharff et al.

(10) Patent No.: US 12,789,715 B1
(45) Date of Patent: Nov. 10, 2026

(54) SENSOR SYSTEM FOR VEHICLE

(71) Applicant: HONDA MOTOR CO., LTD., Tokyo (JP)

(72) Inventors: Austin Scharff, Delaware, OH (US); Julio Marc Muñoz, III, Marysville, OH (US); Kaven O Marte, Dublin, OH (US); Mohamad Al Nashar, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/366,306

(22) Filed: Oct. 22, 2025

(51) Int. Cl.
*B60R 11/00* (2006.01)
*B62D 25/06* (2006.01)
*G01S 7/481* (2006.01)

(52) U.S. Cl.
CPC .............. *B60R 11/00* (2013.01); *B62D 25/06* (2013.01); *G01S 7/481* (2013.01); *B60R 2011/0028* (2013.01)

(58) Field of Classification Search
CPC . B60R 11/00; B60R 2011/0028; B62D 25/06; G01S 7/481
See application file for complete search history.

(56) References Cited

U.S. PATENT DOCUMENTS

| | | | | |
|---|---|---|---|---|
| 4,243,196 A * | 1/1981 | Toda | B60R 1/04 | 296/210 |
| 11,608,082 B1 * | 3/2023 | Anderson | B60W 60/00 | |
| 12,054,101 B2 * | 8/2024 | Maeda | B62D 25/06 | |
| 12,623,615 B2 * | 5/2026 | Chang | B60R 13/0231 | |
| 2016/0297482 A1 * | 10/2016 | Sakabe | G01S 7/4813 | |
| 2018/0015886 A1 * | 1/2018 | Frank | B60R 11/04 | |
| 2018/0265019 A1 * | 9/2018 | Dry | B60R 11/0264 | |
| 2019/0210436 A1 * | 7/2019 | Frederick | B60J 7/043 | |
| 2020/0101905 A1 * | 4/2020 | Taylor | B60R 9/04 | |
| 2023/0075491 A1 * | 3/2023 | Langlais | G01S 7/4043 | |
| 2023/0123315 A1 * | 4/2023 | Huelsen | B60R 11/04 | 340/937 |
| 2023/0173997 A1 * | 6/2023 | Yamada | B60R 11/04 | |
| 2023/0184917 A1 * | 6/2023 | Kim | B60N 2/002 | |
| 2024/0101038 A1 * | 3/2024 | Liffring | B60R 9/042 | |
| 2024/0140325 A1 * | 5/2024 | Maeda | B60R 9/04 | |
| 2024/0140326 A1 * | 5/2024 | Maeda | B60R 11/04 | |
| 2024/0367591 A1 * | 11/2024 | Wesch | B60R 11/04 | |
| 2025/0211915 A1 * | 6/2025 | Ienaka | B60Q 3/51 | |
| 2025/0306210 A1 * | 10/2025 | Sviberg | G01S 17/931 | |
| 2025/0313161 A1 * | 10/2025 | Nagata | B60R 11/00 | |
| 2025/0368270 A1 * | 12/2025 | Takahashi | B62D 25/06 | |

(Continued)

FOREIGN PATENT DOCUMENTS

| | | |
|---|---|---|
| CN | 208931253 U | 6/2019 |
| CN | 217022384 U | 7/2022 |

(Continued)

*Primary Examiner* — Toan C To

(74) *Attorney, Agent, or Firm* — Mark Duell; American Honda Motor Co., Inc.

(57) ABSTRACT

A sensor system for a vehicle is disclosed. The sensor system comprises a front roof rail of a vehicle body of the vehicle. The sensor system further comprises a sensor unit mounted on the front roof rail. The sensor system further comprises a damping member. The sensor system further comprises at least one fastening unit attaching the damping member to the front roof rail. The damping member is spaced apart from the sensor unit.

16 Claims, 2 Drawing Sheets

(56) References Cited

U.S. PATENT DOCUMENTS

| | | | | |
|---|---|---|---|---|
| 2025/0381919 | A1* | 12/2025 | Robertson, Jr. | B60R 11/00 |
| 2025/0388057 | A1* | 12/2025 | Will | B60H 1/00271 |
| 2026/0054659 | A1* | 2/2026 | Harada | B60R 13/0212 |
| 2026/0056293 | A1* | 2/2026 | Chen | B60R 11/00 |
| 2026/0098749 | A1* | 4/2026 | Robertson, Jr. | G01D 11/245 |

FOREIGN PATENT DOCUMENTS

| | | | |
|---|---|---|---|
| KR | 20080019325 | A | 3/2008 |
| KR | 20080030232 | A | 4/2008 |
| KR | 20080054822 | A | 6/2008 |
| KR | 20100048619 | A | 5/2010 |
| KR | 20170034594 | A | 3/2017 |

* cited by examiner

SENSOR SYSTEM FOR VEHICLE

BACKGROUND

The disclosed subject matter relates to a sensor system for a vehicle. The disclosed subject matter further relates to a vehicle comprising a sensor system.

A vehicle may comprise a sensor unit mounted on a vehicle body thereof for determining information of the outside environment to provide driving assistance. As an example, the sensor unit may be a Light Detection and Ranging (LiDAR) unit to measure distances to remote targets. The LiDAR unit may direct emitted light pulses across a desired path. However, the emitted light pulses may inadvertently deviate from the desired path due to external influences, such as vibrations or other external forces experienced at the LiDAR unit.

SUMMARY

In accordance with one embodiment of the present disclosure, a sensor system for a vehicle is disclosed. The sensor system comprises a front roof rail of a vehicle body of the vehicle. The sensor system further comprises a sensor unit mounted on the front roof rail. The sensor system further comprises a damping member. The sensor system further comprises at least one fastening unit attaching the damping member to the front roof rail. The damping member is spaced apart from the sensor unit.

In accordance with another embodiment of the present disclosure, a vehicle is disclosed. The vehicle comprises a vehicle body. The vehicle further comprises a sensor system. The sensor system comprises a front roof rail of the vehicle body. The sensor system further comprises a sensor unit mounted on the front roof rail. The sensor system further comprises a damping member. The sensor system further comprises at least one fastening unit attaching the damping member to the front roof rail. The damping member is spaced apart from the sensor unit.

In accordance with yet another embodiment of the present disclosure, a sensor system for a vehicle is provided. The sensor system comprises a front roof rail of a vehicle body of the vehicle. The front roof rail comprises a base portion. The front roof rail further comprises a member mounting portion extending perpendicularly to the base portion. The front roof rail further comprises at least one rail through-hole located on the member mounting portion. The sensor system further comprises a sensor unit mounted on the front roof rail and disposed on the base portion. The sensor system further comprises a damping member. The damping member comprises at least one member through-hole. The sensor system further comprises at least one fastening unit attaching the damping member to the front roof rail at the member mounting portion. The at least one fastening unit is received through the at least one rail through-hole and the at least one member through-hole. The damping member is spaced apart from the sensor unit.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-3, wherein like numbers indicate the same or corresponding elements throughout the views.

The following comprises definitions of selected terms employed herein. The definitions comprise various examples and/or forms of components that fall within the scope of a term and that can be used for implementation. The examples are not intended to be limiting.

As used herein, “a,” “an,” “the,” “at least one,” and “one or more” are used interchangeably.

As used herein, “at least one of A and B” should be understood to mean “only A, only B, or both A and B.”

As used herein, the term “sensor unit” refers broadly to any self-contained device, module, or integrated assembly of components configured to perceive the external environment or the internal state of a vehicle. This perception may be achieved through the emission and detection of various forms of energy, such as light, radio waves, or sound, or through the passive measurement of ambient conditions or forces. A sensor unit may generate data representative of, for example, the presence, distance, velocity, or characteristics of objects, as well as the orientation and position of the vehicle. The generated data may be utilized by one or more vehicle control systems, such as an Advanced Driver-Assistance System (ADAS) or an autonomous driving system. Non-limiting examples of a sensor unit include an imaging unit, a LiDAR unit, a radar unit, a sonar unit, and so forth.

Figure 1:
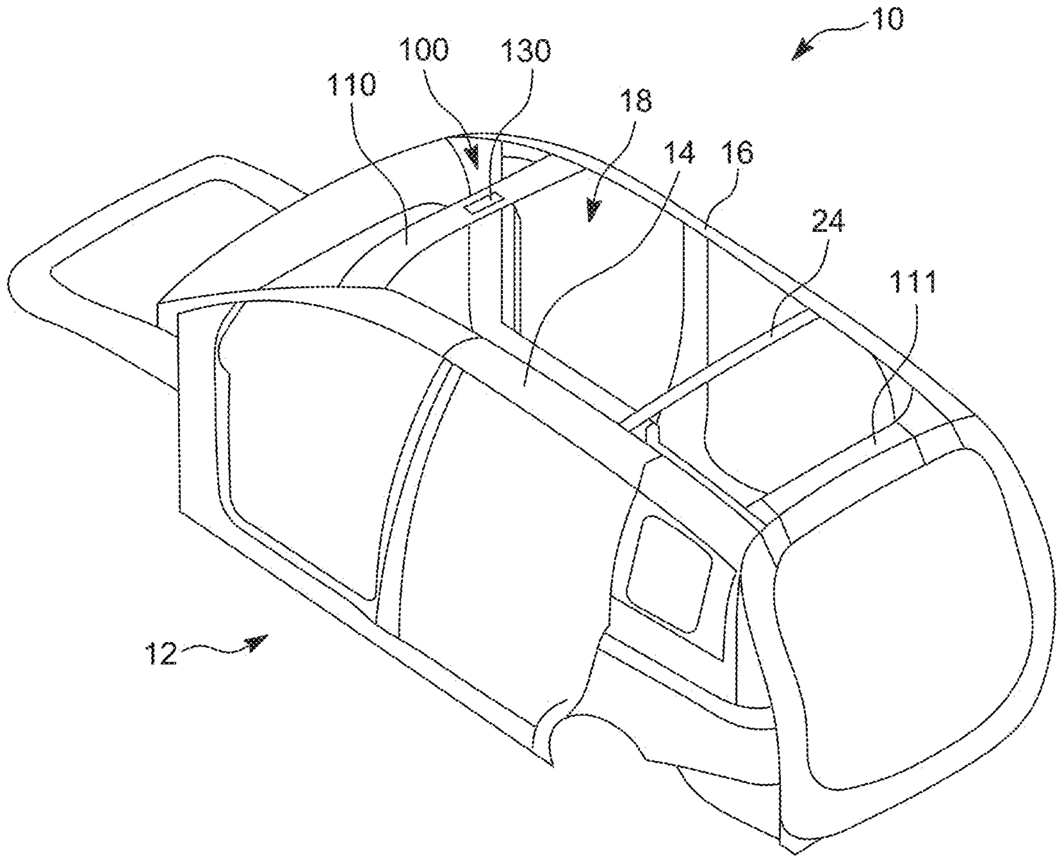
FIG. 1 is a perspective view of a vehicle body of a vehicle and a sensor system, in accordance with an embodiment of the present disclosure.

Referring now to the figures, FIG. 1 shows a perspective view of a vehicle body 12 of a vehicle 10, in accordance with an embodiment of the present disclosure.

The vehicle 10 comprises the vehicle body 12. The vehicle body 12 may comprise a pair of laterally spaced body members 14, 16 that define sides of a passenger compartment 18. The spaced body members 14, 16 may partially define a door frame. A front roof rail 110 and a rear roof rail 111 may span between the spaced body members 14, 16. A cross member 24 (also referred to as “roof bow”) may be interposed between the front roof rail 110 and the rear roof rail 111, and extend between the spaced body members 14, 16. The spaced body members 14, 16, together with the front and rear roof rails 110, 111 may support a vehicle roof structure (not shown) over the passenger compartment 18.

Figure 2:
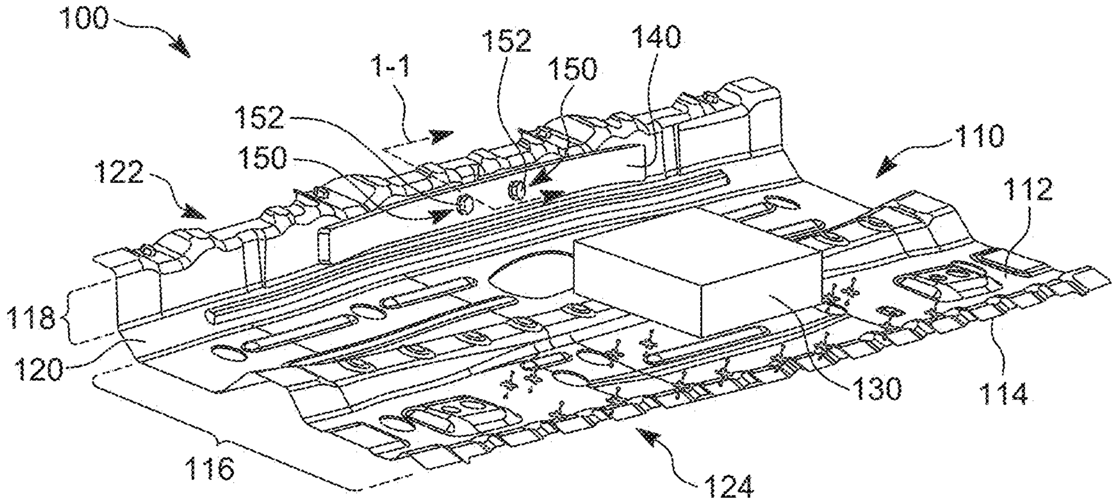
FIG. 2 is a perspective view of a portion of a front roof rail of the sensor system, in accordance with an embodiment of the present disclosure.

The vehicle 10 further comprises a sensor system 100. The sensor system 100 is shown in more detail in FIG. 2. Referring to FIGS. 1 and 2, the sensor system 100 comprises the front roof rail 110. The sensor system 100 further comprises a sensor unit 130 (schematically depicted by a block in FIG. 1) mounted on the front roof rail 110. In some embodiments, the sensor unit 130 may be a light detection and ranging (LiDAR) unit. The sensor unit 130 may be mounted on the front roof rail 110 using any suitable technique, such as by fasteners, such as bolts, screws, or clips; adhesives; welding; integrated snap-fit features, and so forth.

The sensor system 100 further comprises a damping member 140. The damping member 140 is spaced apart from the sensor unit 130. The sensor system 100 further comprises at least one fastening unit 150 attaching the damping member 140 to the front roof rail 110. In some embodiments, the damping member 140 may be rigid. In some embodiments, the damping member 140 may comprise a ferrous alloy (e.g., JSH270C). In some embodiments, the damping member 140 have a mass of from 0.5 kilograms to 2 kilograms. The mass of the damping member 140 may be tuned based on various attributes of the vehicle.

The sensor system 100 may reduce noise, vibration, and harshness (NVH) at the sensor unit 130. Specifically, the damping member 140 attached to the front roof rail 110 via the at least one fastening unit 150 may provide vibration damping at the front roof rail 110, thereby improving the stability and operational integrity of the sensor unit 130 mounted on the front roof rail 110. The sensor system 100 may thus enhance the accuracy, precision, and reliability of the data captured by the sensor unit 130 by reducing measurement errors, jitter, and artifacts that may be caused due to vibrations at the front roof rail 110. As a result, the sensor unit 130 may generate a higher-quality output for vehicle systems that operate based on the data generated by the sensor unit 130. Furthermore, the sensor system 100 may extend the operational lifespan of the sensor unit 130 and reduce the likelihood of a premature failure of the sensor unit 130.

Figure 3:
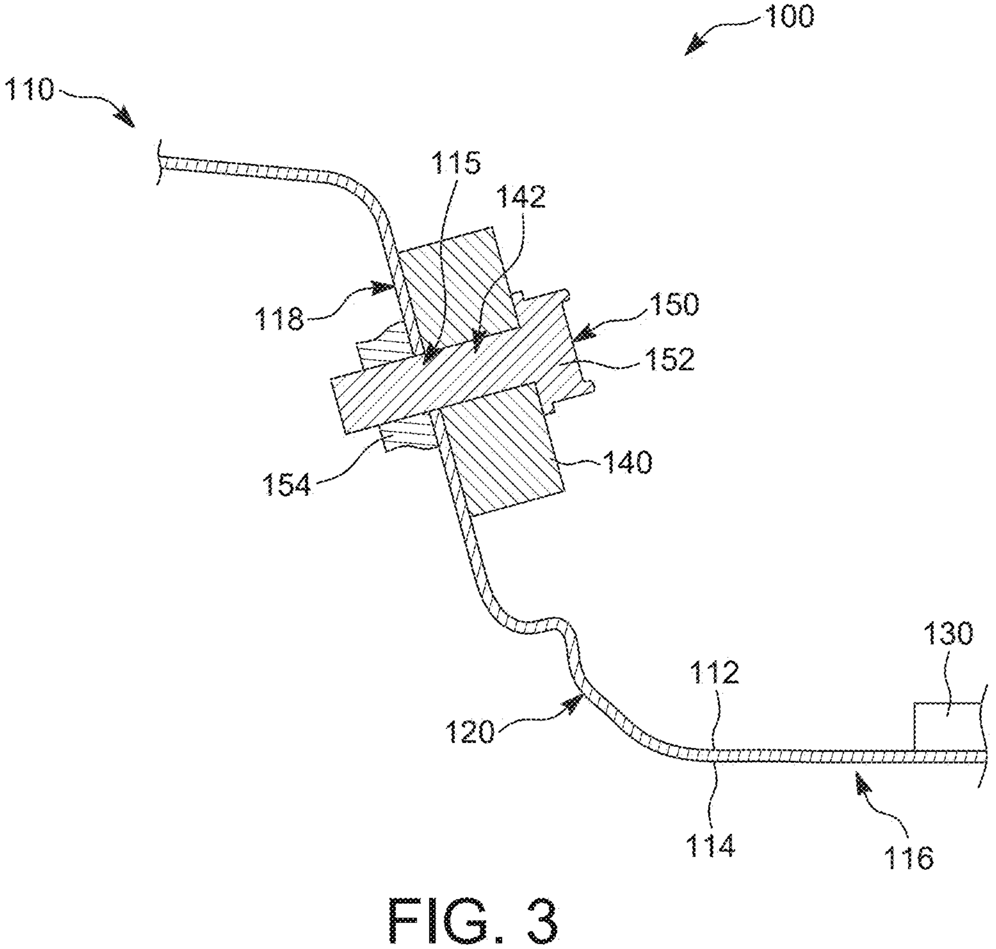
FIG. 3 is a cross-sectional view of a portion of the sensor system taken along a line 1-1 of FIG. 2, in accordance with an embodiment of the present disclosure.

Referring now to FIGS. 2 and 3, the front roof rail 110 may comprise at least one rail through-hole 115. Furthermore, the damping member 140 may comprise at least one member through-hole 142. The at least one fastening unit 150 may be received through the at least one rail through-hole 115 and the at least one member through-hole 142. In the illustrated embodiment of FIG. 2, the at least one fastening unit 150 comprises two fastening units 150 that attach the damping member 140 to the front roof rail 110.

The at least one fastening unit 150 may comprise a first fastening member 152 at least partially received within each of the at least one rail through-hole 115 and the at least one member through-hole 142. The at least one fastening unit 150 may further comprise a second fastening member 154 coupled to the first fastening member 152. The second fastening member 154 may at least partially receive the first fastening member 152 therethrough.

In some embodiments, the first fastening member 152 may be a bolt. In some embodiments, the second fastening member 154 may be a nut. In some embodiments, the second fastening member 154 may be integral with the front roof rail 110. In some embodiments, the second fastening member 154 may be welded to the front roof rail 110. Specifically, in some embodiments, the second fastening member 154 may be a weld nut.

The second fastening member 154 being integrated or welded to the front roof rail 110 may allow the damping member 140 to be directly and securely attached to the front roof rail 110 using the first fastening member 152. This configuration may simplify the manufacturing and assembly process of the sensor system 100, which in turn may lower production costs. Furthermore, this configuration may result in a more compact and space-efficient design, improving packaging efficiency and allowing for easier integration within the constrained environment of the front roof rail 110. For example, the sensor system 100 may be useful in cases where direct welding of the damping member 140 to the front roof rail 110 is not feasible due to material or thickness constraints.

In some embodiments, the front roof rail 110 may further comprise a base portion 116 and a member mounting portion 118 extending perpendicularly to the base portion 116. In some embodiments, the member mounting portion 118 may be obliquely inclined to the base portion 116. The front roof rail 110 may further comprise an intermediate portion 120 connecting the member mounting portion 118 to the base portion 116. In some embodiments, the intermediate portion 120 may be curved. In some embodiments, the base portion 116, the intermediate portion 120, and the member mounting portion 118 may be integral.

In some embodiments, the at least one rail through-hole 115 may be located at the member mounting portion 118. The damping member 140 may be disposed on the member mounting portion 118. In other words, the at least one fastening unit 150 may attach the damping member 140 to the member mounting portion 118 of the front roof rail 110. In some embodiments, the sensor unit 130 may be disposed on the base portion 116. The sensor unit 130 is schematically depicted by a block in FIG. 3.

The front roof rail 110 may further comprise a first end 122, and a second end 124 opposite to the first end 122. The member mounting portion 118 may be located proximal to the first end 122. The base portion 116 may define the second end 124. The damping member 140 may be proximal to the first end 122. The sensor unit 130 may be proximal to the second end 124.

The front roof rail 110 may further comprise a first surface 112 and a second surface 114 opposite to the first surface 112. The damping member 140 may be disposed on the first surface 112. The second fastening member 154 may be disposed on the second surface 114. In some embodiments, the second fastening member 154 may be welded to the second surface 114 at the member mounting portion 118. The sensor unit 130 may be disposed on the first surface 112. Specifically, the sensor unit 130 may be disposed on the first surface 112 at the base portion 116.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the disclosure be defined by the claims appended hereto.

What is claimed is:

1. A sensor system for a vehicle, the sensor system comprising:

a front roof rail of a vehicle body of the vehicle;

a sensor unit mounted on the front roof rail;

a damping member; and at least one fastening unit attaching the damping member to the front roof rail, wherein the damping member is spaced apart from the sensor unit, wherein the front roof rail includes a base portion and a member mounting portion extending perpendicularly to the base portion, and wherein the sensor unit is disposed on the base portion and the damping member is disposed on the member mounting portion.

2. The sensor system of claim 1, wherein:

the front roof rail comprises at least one rail through-hole;

the damping member comprises at least one member through-hole; and the at least one fastening unit is received through the at least one rail through-hole and the at least one member through-hole.

3. The sensor system of claim 2, wherein the at least one fastening unit comprises:

a first fastening member at least partially received within each of the at least one rail through-hole and the at least one member through-hole; and a second fastening member coupled to the first fastening member, wherein the second fastening member at least partially receives the first fastening member therethrough.

4. The sensor system of claim 3, wherein the first fastening member is a bolt, and wherein the second fastening member is a nut.

5. The sensor system of claim 3, wherein the second fastening member is welded to the front roof rail.

6. The sensor system of claim 3, wherein the second fastening member is integral with the front roof rail.

7. The sensor system of claim 1, wherein the front roof rail comprises a first surface and a second surface opposite to the first surface, wherein the sensor unit is disposed on the first surface, and wherein the damping member is disposed on the first surface.

8. The sensor system of claim 1, wherein the front roof rail further comprises an intermediate portion connecting the member mounting portion to the base portion.

9. The sensor system of claim 8, wherein the base portion, the intermediate portion, and the member mounting portion are integral.

10. The sensor system of claim 1, wherein the front roof rail further comprises a first end and a second end opposite to the first end, wherein the member mounting portion is located proximal to the first end, and wherein the base portion defines the second end.

11. The sensor system of claim 1, wherein the sensor unit is a light detection and ranging unit.

12. A vehicle, comprising:

a vehicle body; and a sensor system, the sensor system comprising:

a front roof rail of the vehicle body;

a sensor unit mounted on the front roof rail;

a damping member; and at least one fastening unit attaching the damping member to the front roof rail, wherein the damping member is spaced apart from the sensor unit, wherein the front roof rail includes at least one through-hole, the damping member includes at least one member through-hole, and the at least one fastening unit is received through the at least one rail through-hole and the at least one member through-hole, and wherein the at least one fastening unit includes first and second fastening members, the first fastening member being at least partially received within each of the at least one rail through-hole and the at least one member through-hole, the second fastening member being coupled to the first fastening member and at least partially receiving the first fastening member therethrough, and wherein the second fastening member is welded to the front roof rail.

13. The vehicle of claim 12, wherein the front roof rail comprises:

a base portion; and a member mounting portion extending perpendicularly to the base portion, wherein the sensor unit is disposed on the base portion, and wherein the damping member is disposed on the member mounting portion.

14. The vehicle of claim 13, wherein the front roof rail further comprises an intermediate portion connecting the member mounting portion to the base portion.

15. The vehicle of claim 12, wherein the sensor unit is a light detection and ranging unit.

16. A sensor system for a vehicle, the sensor system comprising:

a front roof rail of a vehicle body of the vehicle, the front roof rail comprising:

a base portion;

a member mounting portion extending perpendicularly to the base portion; and at least one rail through-hole located on the member mounting portion;

a sensor unit mounted on the front roof rail and disposed on the base portion;

a damping member comprising at least one member through-hole and disposed on the member mounting portion; and at least one fastening unit attaching the damping member to the front roof rail at the member mounting portion, wherein the at least one fastening unit is received through the at least one rail through-hole and the at least one member through-hole, and wherein the damping member is spaced apart from the sensor unit.

* * * * *